United States Patent Office 3,420,870
Patented Jan. 7, 1969

3,420,870
DIPHENETHYLBENZENE MIXED ESTER CARBOXAMIDES
Ferdinand B. Zienty, Warson Woods, and Myron J. Holm, Olivette, Mo., assignors to Monsanto Company, St. Louis, Mo., a corporation of Delaware
No Drawing. Original application June 5, 1964, Ser. No. 373,065, now Patent No. 3,293,278, dated Dec. 20, 1966. Divided and this application Mar. 24, 1966, Ser. No. 537,024
U.S. Cl. 260—471     3 Claims
Int. Cl. C07c 103/24

ABSTRACT OF THE DISCLOSURE

Certain p - diphenethylbenzene-$\alpha,\alpha,\beta,\beta$-tetracarboxylic acid dialkyl ester amides are valuable as intermediate for the preparation of plasticizers, fireproofing agents, gear oil additives, grease additives, fungicides and bacteriostats.

---

The present application is a division of our copending application, Ser. No. 373,065, filed June 5, 1964, now U.S. Patent 3,293,278 granted Dec. 20, 1966.

This invention relates to new chemical compounds and particularly to diphenethylbenzene mixed ester carboxamides. These compounds which exhibit utility as synthetic resin intermediates are characterized by the following structural formula:

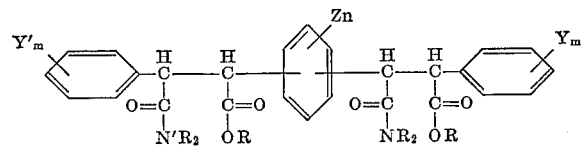

with
R is hydrocarbyl being selected from the group consisting of hydrogen, alkyl, alkenyl, cycloalkyl, phenyl alkyl substituted phenyl or monocyclic aralkyl radicals each containing from 1 to 18 carbon atoms.

Y and Y' each are hydrocarbyl or hydrocarbyl oxy, each containing from 1 to 18 carbon atoms, nitro radicals, halogens and secondary and tertiary amino radicals, Z is a monovalent substituent selected from the group consisting of methyl radicals and halogens, m is a cardinal number from 0 to 5 inclusive, and n is a cardinal number from 0 to 4 inclusive.

Tetracyanodiphenethylbenzene, the parent compound of the present group, can be prepared by the condensation of a benzenediacetonitrile with a benzaldehyde to form dibenzylidenebenzenediacetonitrile followed by cyanation of the dibenzyldenebenzenediacetonitrile. The condensation and cyanation can be conducted in a one-step operation, or the introduction of the additional nitrile groups can be deferred until the condensation is completed. The tetracyanodiphenethylbenzene thus obtained can be hydrolyzed to the tetracarboxylic acid of diphenethylbenzene or its dianhydride. The diester-diamide is thereafter readily formed.

As indicated above, benzaldehyde can be used in the preparation of the present invention. However, in the preparation of compounds having substituents on the terminal benzene rings, it is perferred to use substituted benzaldehydes rather than to add the substituents after the condensation reaction. Specific examples of substituted benzaldehydes that can be employed include methylbenzaldehydes, ethylbenzaldehydes, propylbenzaldehydes, butylbenzaldehydes, decylbenzaldehydes, dodecylbenzaldehydes, octylbenzaldehydes, methoxybenzaldehydes, ethoxybenzaldehydes, propoxybenzaldehydes, butoxybenzaldehydes, nonoxybenzaldehydes, undecoxybenzaldehydes, octadecoxybenzaldehydes, phenylbenzaldehydes, tolylbenzaldehydes, phenoxylbenzaldehydes, toloxybenzaldehydes, nitrobenzaldehydes, chlorobenzaldehydes, fluorobenzaldehydes, bromobenzaldehydes, iodobenzaldehydes, nitrohalobenzaldehydes, alkylhalobenzaldehydes, alkoxyhalobenzaldehydes, aroxyhalobenzaldehydes, alkylnitrobenzaldehydes, alkylnitrohalobenzaldehydes and the like. The substituents on the benzaldehyde nucleus can vary in a number from one through five, be like or unlike, and members of the groups indicated hereinbefore.

The benzenediacetonitrile to be condensed with the benzaldehyde may be ortho, meta or para, substituted or unsubstituted. Suitable benzenediacetonitrile include mono-, di-, tri-, and tetra-methylbenzenediacetonitriles, mono-, di-, tri- and tetra-chlorobenzenediacetonitriles, mono-, di-, tri- and tetra-fluorobenzenediacetonitriles, mono-, di-, tri- and tetra-bromobenzenediacetonitriles, and mono-, di-, tri- and tetra-iodobenzenediacetonitriles. Mixed halobenzenediacetonitriles and methylhalobenzenediacetonitriles may also be employed. Examples of suitable benzenediacetonitriles of these groups include chlorofluoro-, chlorobromo-, chloroiodo-, fluorobromo-, fluoroiodo-, bromochloro-, bromoiodo-, chlorobromoiodomethylchloro, methylfluoro, methyliodo-, methylbromobenzenediacetonitriles and the like.

As indicated above, R in the foregoing formulae can be hydrogen or a hydrocarbon group containing from one to eighteen carbon atoms. Representative alkyl groups include methyl, ethyl, propyl, butyl, pentyl, hexyl, heptyl, octyl, nonyl, decyl, hendecyl, dodecyl, tridecyl, tetradecyl, pentadecyl, hexadecyl, heptadecyl, octadecyl and the like. Suitable alkenyl groups include, for example, vinyl, propenyl, butenyl, pentenyl, hexenyl, heptenyl, octenyl, nonenyl, decenyl, hendecenyl, dodecencyl, tridecenyl, tetradecenyl, pentadecenyl, hexadecenyl, hepetadecenyl, octadecenyl and the like. Alkenyl groups containing more than one double bond are also suitable. Cycloalkyl groups represented by R include cyclopropyl, cyclobutyl, cyclopentyl, cyclohexyl, cycloheptyl, cyclooctyl and the like. The cycloalkyl groups can have one or more hydrocarbon side chains to provide substituted cycloalkyl groups containing as many as eighteen carbon atoms. Aryl groups represented by R include phenyl and alkyl substituted phenyl such as, tolyl, xylyl, ethylpehnyl, propylphenyl, butylphenyl, pentylphenyl, hexylphenyl, heptylphenyl, octylphenyl, nonylphenyl, decylphenyl, hendecylphenyl, dodecylphenyl and the like. Thus, the aryl groups can have one or more alkyl substituents containing a maximum of twelve carbon atoms. Representative monocyclic aralkyl or alphyl groups designated by R includes benzyl, phenylethyl, phenylpropyl, phenylbutyl, phenylpentyl, phenylhexyl, phenylheptyl, phenyloctyl, phenylnonyl, phenyldecyl, phenylhendecyl, phenyldodecyl, xylylethyl and the like. While it is preferred that all of the above hydrocrabon groups are unsubstituted, they can have nitro groups or halogens. Also, the hydrocarbon chains can be either straight or branched.

The invention will be further clarified by reference to the following detailed descriptions of the preparation of compounds encompassed thereby. Unless otherwise specified, all proportions in these examples and throughout the specification are expressed in parts by weight.

EXAMPLE 1 p-Diphenethylbenzene-$\alpha,\alpha',\beta,\beta'$-tetracarboxylic di-methyl ester diamide Approximately 10 g. of (p-diphenethylbenzene-$\alpha,\alpha',\beta,\beta'$-tetracarboxylic acid) dianhydride prepared according to Example 32 in our copending application, Serial No. 373,065, filed June 5, 1964, now U.S. Patent 3,293,278 granted Dec. 20, 1966, is dissolved in 200 ml. of acetonitrile in a suitable vessel provided with means for vigorous agitation and with an inlet for subsurface introduction of a gas. Ammonia is then passed into the stirred mixture for 4 hours. Then all of the volatile materials are removed by distillation under reduced pressure. The residue is dissolved in approximately 500 ml. of water and 20 ml. of 5 N hydrochloric acid is added. A precipitate of the diacid-diamide forms. It is collected by filtration and re-dissolved in a solution of 2 g. of sodium hydroxide in 100 ml. of water. While this solution is vigorously stirred at roo mtemperature, 5.5 g. of dimethyl sulfate is added. Stirring is continued and after one-half hour, an additional 1 g. of sodium hydroxide, followed by 2.7 g. of dimethyl sulfate is added. Following a second one-half hour's stirring, the mixture is buffered by the addition of 5 g. of sodium bicarbonate, and then warmed to 60° C. for 15 minutes. The separated p-diphenethylbenzene - α,α',β,β'-tetracarboxylic dimethylester diamide is collected, washed with 100 ml. of a 1% solution of sodium bicarbonate, then 100 ml. of water. The product thus obtained is a white solid having a melting point above 300° C.

EXAMPLE 2 p-Diphenethylbenzene-α,α',β,β'-tetracarboxylic acid, dimethyl ester, N,N'-dimethylamide About 10 grams of the dianhydride as in Example 1 is dissolved in about 200 ml. of acetonitrile in a suitable reactor equipped with an agitator. Then two equivalents of methylamine are added and the volatile materials are removed by distillation under reduced pressure. The residue of diacid-diamide is dissolved in an agitated solution of 3 grams of sodium hydroxide in water, and about 8 grams of dimethyl sulfate is fed in slowly. The insoluble product, the diester-diamide, is separated and dried.

EXAMPLE 3 p-Diphenethylbenzene-α,α',β,β'-tetracarboxylic acid, dimethyl ester, N,N'-di-n-butylamide This product is made in accordance with the procedure of Example 2 using n-butylamine in place of methylamine.

EXAMPLE 4 p-Diphenethylbenzene-α,α',β,β'-tetracarboxylic acid, diethyl ester, N,N'-dioctylamide This product is made in accordance with the procedures of Example 2 using octylamine in place of methylamine and diethyl sulfate in place of dimethyl sulfate.

EXAMPLE 5 p-Diphenethylbenzene-α,α',β,β'-tetracarboxylic acid, dimethyl ester, N,N,N',N'-tetra-n-butylamide This product is made in accordance with the procedure of Example 2 using di-n-butylamine in place of methylamine.

EXAMPLE 6 p-Diphenethylbenzene-α,α',β,β'-tetracarboxylic acid, diethyl ester, N,N'-dicyclohexylamide This product is made in accordance with the procedure of Example 2 using cyclohexylamine in place of methylamine and diethyl sulfate in place of dimethyl sulfate.

EXAMPLE 7 p-Diphenethylbenzene-α,α',β,β'-tetracarboxylic acid, dimethyl ester, N,N'-dicycloheptylamide This product is made in accordance with the procedure of Example 2 using cycloheptylamine in place of methylamine.

EXAMPLE 8 p-Diphenethylbenzene-α,α',β,β'-carboxylic acid, dimethyl ester, N,N'-di(β-phenethyl)amide This product is made in accordance with the procedure of Example 2 using β-phenethylamine in place of methylamine.

EXAMPLE 9 p-Diphenethylbenzene-α,α',β,β'-tetracarboxylic acid, dimethyl ester, N,N'-diphenylamide This product is made in accordance with the procedure of Example 2 using aniline in place of methylamine.

EXAMPLE 10 p-Diphenethylbenzene-α,α',β,β'-tetracarboxylic acid, dimethyl ester, N,N'-di-pentamethylene amide This product is made in accordance with the procedure of Example 2 using piperidine in place of methylamine.

EXAMPLE 11

N,N'-dicyclohexyl-p-diphenethylbenzene-α,α',β,β'-tetracarboxylic acid diamide

About 10 grams of the dianhydride as in Example 1 is dissolved in 200 ml. of acetonitrile in a suitable reaction vessel equipped with a stirrer. Then two equivalents of cyclohexylamine are added slowly. The volatile materials are removed by distillation under reduced pressure leaving the diacid-diamide.

EXAMPLE 12

N,N'-dicyclohexyl-p-diphenethylbenzene-α,α',β,β'-tetracarboxylic acid diamide dichloride About 5 grams of the diacid-diamide prepared in accordance with Example 11 is mixed with about 50 ml. of thionyl chloride in a reactor provided with an agitator and the mixture heated until the evolution of sulfur dioxide and hydrogen chloride has ceased. Removal of the excess thionyl chloride by distillation leaves the diamide-diacid/chloride.

The compounds produced in accordance with the present invention are crystalline compounds of moderate molecular weight. They are insoluble in water, but readily soluble in a variety of commercially available solvents. They are of particular value as resin intermediates, and also as (intermediates in the preparation of) plasticizers, flame proofing agents, gear oil additives, high temperature grease additives, fungicides and in numerous other industrial applications. In addition a number of the compounds under consideration exhibit bacteriostatic properties. These products are also valuable since they present a series of compounds in which the melting point can be varied while the chemical characteristics are maintained substantially constant. High melting products are obtained by using the para form of benzene diacetonitrile as the starting material, whereas the ortho and meta benzene diacetonitriles yield lower melting products, The present diester diamides can be used as plasticizers for polyvinyl chloride resins, imparting unusually low volatility to the resin compositions.

Numerous modifications and additional compounds will readily suggest themselves to those skilled in the art. Thus, while the invention has been described with particular reference to specific embodiments, it is to be understood that it is not to be limited thereto but is to be construed broadly and restricted solely by the scope of the appended claims.

The embodiments of the invention in which an exclusive property or privilege is claimed are defined as follows:

1. A diphenethylbenzene-α,α',β,β'-dicarboxylate dicarboxamide having the formula

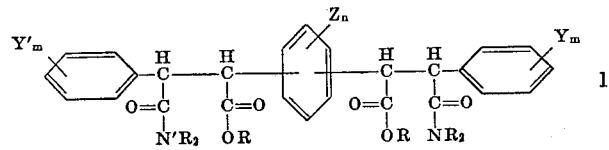

wherein

R is hydrocarbyl having up to 18 carbon atoms and selected from the group consisting of hydrogen, alkyl, alkenyl, cycloalkyl, phenyl, alkyl substituted phenyl or monocyclic aralkyl, Y and Y' each are hydrocarbyl or hydrocarbyl oxy, each having up to 18 carbon atoms, nitro or halogen, Z is methyl or halogen, $m$ is a cardinal number from 0 to 5 inclusive, and $n$ is a cardinal number from 0 to 4 inclusive.

2. A compound according to claim 1 which is p-diphenethylbenzene-α,α',β,β'-tetracarboxylic dimethyl ester diamide.

3. A compound according to claim 1 which is p-diphenethylbenzene-α,α',β,β'-tetracarboxylic acid dimethyl ester, N,N'-dimethylamide.

References Cited

UNITED STATES PATENTS 3,293,276  12/1966  Kühle et al. _____ 260—520

LORRAINE A. WEINBERGER, *Primary Examiner.*

L. A. THAXTON, *Assistant Examiner.*

U.S. Cl. X.R.

260—515, 520, 999